United States Patent [19]

Gilbert et al.

[11] Patent Number: 5,061,837

[45] Date of Patent: Oct. 29, 1991

[54] METHOD AND APPARATUS FOR SELECTIVELY DEMETALLIZING A METALLIZED FILM

[75] Inventors: William B. Gilbert, Appleton; Jack V. Roberts, Neenah; Alfred J. Walker, DePere, all of Wis.

[73] Assignee: Webex, Inc., Neenah, Wis.

[21] Appl. No.: 346,062

[22] Filed: May 2, 1989

[51] Int. Cl.⁵ .................... B23K 11/00; H05B 6/80
[52] U.S. Cl. ...................... 219/68; 29/25.42; 219/10.55 E; 346/163
[58] Field of Search ............. 219/383, 384, 68, 69.17, 219/10.55 E, 10.55 M; 346/162, 163, 164; 156/627; 430/318; 426/107, 113, 124, 126; 29/25.42

[56] References Cited

U.S. PATENT DOCUMENTS

| | | | |
|---|---|---|---|
| 1,825,551 | 9/1931 | Serrell | 346/163 |
| 2,435,441 | 2/1948 | Grouse | 219/68 |
| 2,671,157 | 3/1954 | Dubilier | 219/68 |
| 2,716,180 | 8/1955 | Dubilier | 219/384 |
| 2,930,109 | 3/1960 | Robinson et al. | 29/25.42 |
| 3,119,919 | 1/1964 | Pratt | 219/384 |
| 3,198,934 | 8/1965 | Dubilier | 219/384 |
| 3,424,895 | 1/1969 | Olson | 219/384 |
| 3,502,845 | 3/1970 | Shirmer | 219/384 |
| 3,754,117 | 8/1973 | Walter | 219/383 |
| 3,895,207 | 7/1975 | Heywang et al. | 219/68 |
| 3,895,208 | 7/1975 | Kraus | 219/68 |
| 3,994,300 | 11/1976 | Siddons | 128/303 |
| 4,089,034 | 5/1978 | Taylor et al. | 29/25.42 |
| 4,219,727 | 8/1980 | Bolt | 219/384 |
| 4,325,167 | 4/1982 | Rosenberg | 29/25.42 |
| 4,352,145 | 9/1982 | Stockman | 29/25.42 |
| 4,398,994 | 8/1983 | Beckett | 156/659.1 |
| 4,517,045 | 5/1985 | Beckett | 156/345 |
| 4,552,614 | 11/1985 | Beckett | 156/640 |
| 4,610,755 | 9/1986 | Beckett | 156/634 |
| 4,638,402 | 1/1987 | Lim et al. | 29/25.42 |
| 4,685,997 | 8/1987 | Beckett | 156/629 |

FOREIGN PATENT DOCUMENTS

205304 12/1986 European Pat. Off. .
3601650 7/1986 Fed. Rep. of Germany ...... 426/126

Primary Examiner—Geoffrey S. Evans
Attorney, Agent, or Firm—Foley & Lardner

[57] ABSTRACT

A method and apparatus for selectively demetallizing a metallized film whereby the metallized web is selectively demetallized by bringing the web into contact with two electrodes, one of which contacts a greater surface area of the web than the other, and maintaining an electrical potential difference between the two electrodes. Preferably, the electrodes comprise rollers, one of which may be provided with a predetermined pattern. The potential difference between the respective electrodes can be controlled to effect selected demetalization of predetermined desired regions of the web or to vary the extent of demetalization from a desired region. The web material can subsequently be used as microwavable packaging material.

49 Claims, 3 Drawing Sheets

METHOD AND APPARATUS FOR SELECTIVELY DEMETALLIZING A METALLIZED FILM

BACKGROUND OF THE INVENTION

1. Technical Field

The present invention relates, generally, to methods and apparatus for selectively demetallizing a web having a metallic surface, and more particularly, to patterned removal of metal from a metallized traveling web.

2. Background Art and Technical Problems

In certain applications it is desirable to demetallize predetermined portions of a metallized substrate. For example, in the packaging of microwavable foodstuffs, certain interior portions of the package are advantageously metallized to facilitate browning and crisping of the food; the metallized paperboard absorbs microwave energy and radiates heat in excess of the heat typically produced by the food alone. More particularly, in packages containing a combination of different foods, it is often desirable to brown only certain of the foods, the remaining foods being heated solely through vibration of the food molecules. Accordingly, packaging material having predetermined selected metallized and demetallized regions is desirable. Such selective demetallization of microwave packaging has typically been effected using masks and chemical etchants.

In general, techniques for electrically demetallizing portions of metallized webs are known. For example, Heywang et al. U.S. Pat. No. 3,895,207, issued July 15, 1975, discloses a method and apparatus for the production of metal-free paths on metallized insulator foils for use in the production of capacitors by winding alternating strips of metallized paper and dielectric film about a common spool. A moving flexible web having a metallized surface is directed along a path, the web being partially wrapped around a grounded conductive roller. A metal tape (wire) serves as a burning electrode and contacts the metallized foil at a point where the foil wraps around the roller, the metal tape partially embracing the roller. The tape is disposed to maintain sliding contact with the foil as the tape is wound from a first spindle to a second spindle. One of the tape (wire) spindles is electrically conductive, there being a potential difference maintained between the tape and the roller upon which the foil web is partially wrapped around. In this manner, a predetermined region of the metallized web, corresponding to the width of the tape, may be demetallized through traveling contact with the burning electrode.

Other examples of demetallizing techniques are described in Rosenberg U.S. Pat. No. 4,325,167 issued Apr. 20, 1982 and Pratt U.S. Pat. No. 3,119,919 issued Jan. 28, 1964.

However, these prior art devices and methods are limited in their ability to selectively demetallize predetermined patterns on the surface of a traveling web. The prior art apparatus tend to be incapable of demetallizing relatively fast moving webs in conjunction with relatively complex patterns. Indeed, the prior art electrical systems designed to operate on a fast moving web are typically restricted to demetallizing strips on the web which run parallel to the direction of web movement.

SUMMARY OF THE INVENTION

The present invention provides methods and apparatus for patterned demetallization of a traveling web without the need for chemicals, foil, a corona or glow discharge effect, or vacuum chambers. In accordance with one aspect of the invention, a metallized web is selectively demetallized by bringing the web into contact with two electrodes, one of which contacts a greater surface area of the web than the other, and maintaining an electrical potential difference between the two electrodes. Current thus flows through the web, with a high current density line contact between the web and one, e.g. the lower potential, electrode.

In accordance with another aspect of the present invention, the potential difference between the respective electrodes is controlled to effect selective demetallization of predetermined desired regions of the web or to vary the extent of the demetallization, i.e., the amount of metal removed from a desired region. In accordance with another aspect of the present invention, a predetermined pattern is disposed on the surface of the high current density electrode, whereby the metal is removed from the surface of the web in accordance with the predetermined pattern disposed on the electrode.

A preferred embodiment of the present invention provides a pair of guide rollers, one of which is maintained at an electrical potential with respect to the other. A relatively large wrap-around area is maintained between the traveling web and the positively charged roller; conversely, a relatively small contact area is effected between the web and the second conductive roller. Accordingly, an electric current, proportional to the difference in electrical potential between the two rollers (electrodes), flows through the metallized portion of the web. A relatively low current density exists at the large wrap around area of the positive roller, whereas a relatively high current density exists between the web and the smaller contact area of the negatively charged roller. Selective demetallization is effected by selectively maintaining and removing the potential difference between the electrodes, and patterns of varying resistivity can be created by modulating the potential difference in accordance with a desired pattern. Further, to facilitate demetallization of complex patterns, the pattern is manifested by the surface of the second roller such that the metallization is removed from the surface of the web in accordance with the pattern.

BRIEF DESCRIPTION OF THE DRAWING

Preferred exemplary embodiments of the present invention will hereinafter be described in conjunction with the appended drawing, wherein like numeral denote like elements.

DETAILED DESCRIPTION OF PREFERRED EXEMPLARY EMBODIMENTS

Figure 1:
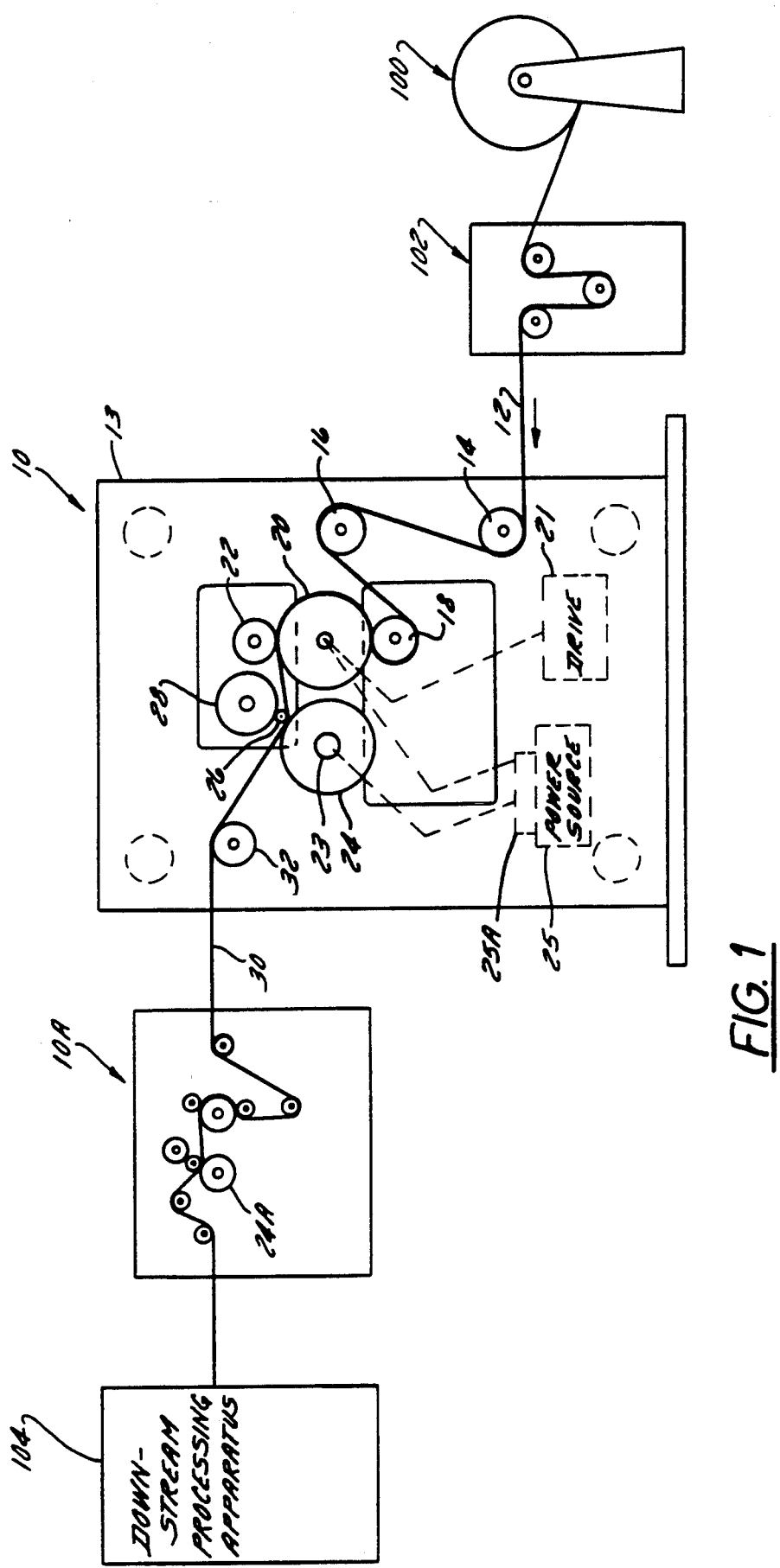
FIG. 1 is a block schematic diagram of a system including demetallization apparatus in accordance with the present invention.
Figure 2:
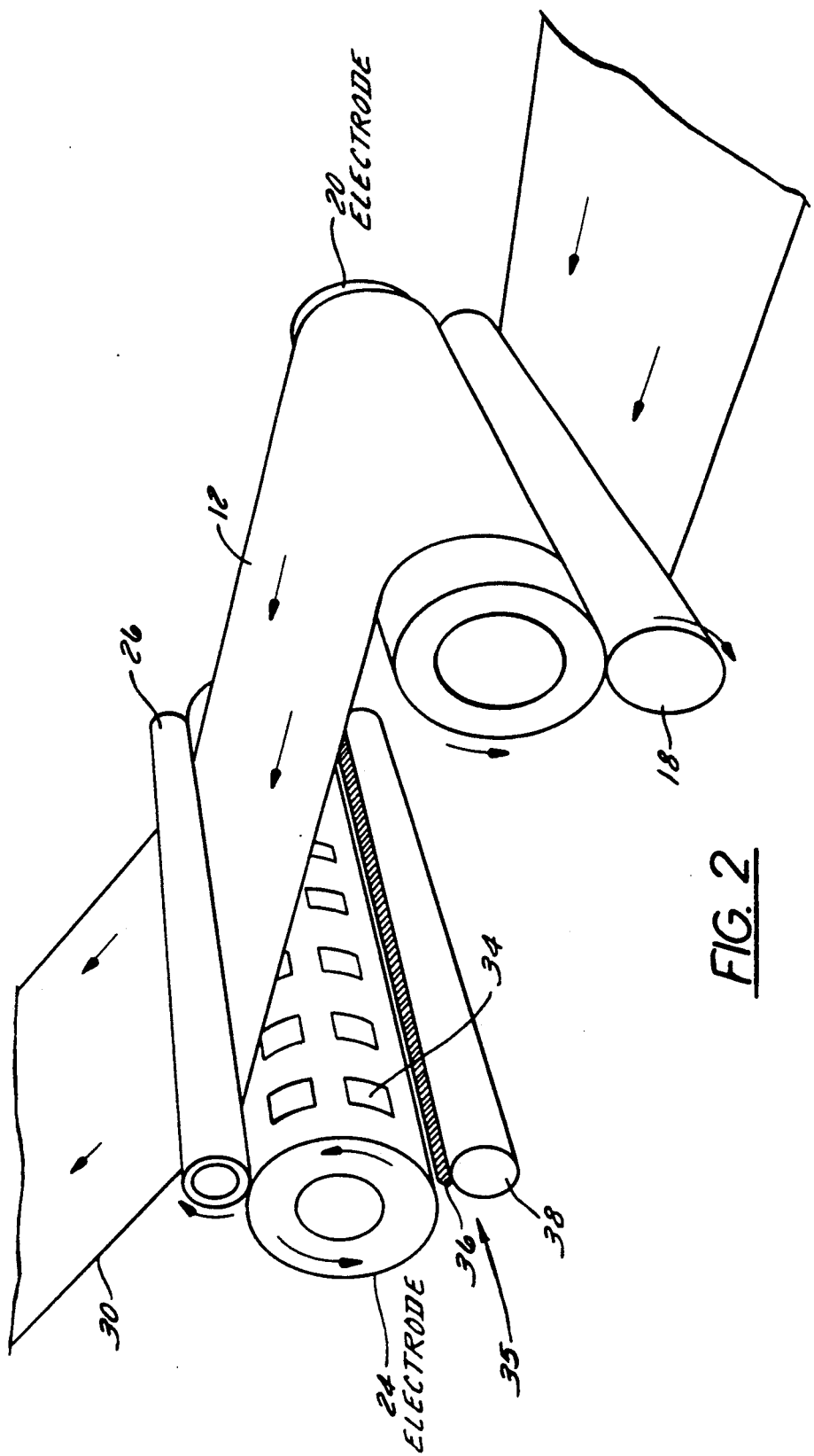
FIG. 2 is a perspective schematic of a web travelling along a web path.

With reference to FIGS. 1 and 2, a metallized web 12 is provided from a conventional web stand 100 and cooperating tension control device 102 through a demetallizing apparatus 10 in accordance with the present invention and thereafter through suitable down stream processing apparatus 104. As will hereinafter be explained, a series of one or more demetallizing apparatus 10 (e.g. 10; 10A) may be employed, cooperating under suitable registration control. Tension control device 102 may be, for example, a pneumatically loaded dancer roll. Down stream processing apparatus 104 may comprise, for example, a suitable rewind stand, or apparatus for manufacture of a component or finished product such as a rotary cutter, laminator and/or the like.

Web 12 may comprise a substrate of any flexible non-conductive material, with at least one surface of the substrate (corresponding to the downward facing surface in the Figures) at least partially metallized, i.e., having metallic particles disposed thereon. The web substrate may be formed of, by way of non-limiting example, paper, cardboard, foil, polyethylene, polypropylene, copolymers thereof, vinyl, mylar, kevlar, or mesh. Metallization may be accomplished, for example, by glow or corona discharge, sputtering, plating, or chemical treatment techniques, as is known in the art.

For use in microwave packaging, web 12 typically comprises a receptor film employing a substrate of 48 or 92 guage polyester (e.g. of a thickness on the order of 0.001 inch) metallized with aluminum for browning to an optical density of 0.18 to 0.29 (having a characteristic resistence on the order of 100 ohm/square). In other applications, web 12 may employ substates of various thickness (e.g. as low as 0.0005 inch) and resistivity (e.g. as low as 1 ohm/square).

Demetallizing apparatus 10 suitably comprises a frame 13, respective rollers 14, 16, 18, 20, 22, 24, 26, 28 and 32, a suitable mechanical drive mechanism, such as an SCR controlled DC drive 21, a suitable power supply 25, and a suitable cleaning mechanism 35 (FIG. 2). The respective rollers are rotatably mounted in frame 13 for rotation about parallel axes, suitably perpendicular to the direction of web movement. As will be explained, rollers 20 and 24 (hereinafter sometimes referred to as electrode rollers 20 and 24) are formed (at least in part) of electrically conductive material, and are rotationally driven by drive mechanism 21. (The motive force for movement of web 12 may be provided by interaction with one or both of rollers 20 and 24). Drive 21 may comprise a common drive for both rollers 20 and 24, or may comprise separate cooperating drive mechanisms associated with the respective rollers.

Web 12 is routed to electrically conductive roller 20 by rollers 14, 16, 18 and 22. Rollers 14, 16, 18 and 22 are preferably electrically non-conductive. Rollers 18 and 22 operate as nip rollers, suitably biased against conductive roller 20 to minimize slippage between web 12 and roller 20 and are disposed relative to conductive roller 20 such that a relatively large wrap around of roller 20 is effected. Thus, a relatively large area of the metallized surface of web 12 is held in contact with the circumference of roller 20 to maintain good electrical contact therebetween.

Web 12 is then routed to second electrode roller 24, which is preferably disposed in relatively close proximity to roller 20, to minimize the web path between the rollers. Web 12 is biased against roller 24, with essentially no wrap around by roller 26. Roller 26, operating as a nip roller, is mechanically biased with constant pressure toward roller 24 to ensure good electrical contact and no slippage between web 12 and roller 24. Such mechanical biasing may be effected using, e.g., convention pneumatic techniques, and a suitable control loop may be employed to control and maintain the pressure at a substantially constant level over time. Roller 32, also preferably nonconductive, receives web 12 immediately downstream of rollers 24 and 26. Roller 32 is disposed to establish a web take off angle relative to rollers 24 and 26, creating a modicum of wrap around nip 26, and no wrap with respect to electrode roller 24 i.e., a curve is created in the web path oppositely directed from the curved surface of electrode roller 24. The area of electrical contact between web 12 and electrode roller 24 is thus a relatively thin line transverse to the direction of web movement, with the width of the contact area established primarily by the diameter and durometer of nip 26.

It is preferable that nip 26 be non-conductive and of as small a diameter as practicable. The use of a nip 26 of relatively small diameter, e.g., in the range of 1 inch to ⅜ inch or less, formed of a relatively hard non-conductive rubber or the like, is facilitated by roller 28 (sometimes hereinafter referred to as backup roller 28) in cooperation with nip 26. Backup roller 28 is of considerably larger diameter than nip 26, disposed parallel to and against nip 26, suitably under mechanical bias. Back up roller 28 tends to prevent bending or distortion of nip 26.

Demetallization is effected by establishing a high density current flow between web 12 and electrode roller 24. An electrical potential differential is maintained between electrode rollers 20 and 24. The metallized surface of web 12, in electrical contact with rollers 20 and 24, provides a current path along the length of web 12 between respective rollers 20 and 24. The close proximity of rollers 20 and 24 minimizes the resistance of such current path. The provision of a relatively large wrap-around (contact area) on roller 20 and a relatively small contact area on roller 24 produces a high current density along the line of contact between web 12 and roller 24 in the vicinity of nip 26. This high density current demetallizes the portion of film 12 through which it flows, losely depositing the metal on roller 24 without damaging the substrate of web 12. Cleaning mechanism 35 removes the metal deposited on roller 24.

Cleaning mechanism 35 may comprise any suitable apparatus for removing residual metal particles from roller 24. For example, a brush 36 may be employed. If desired, brush 36 may be mounted on a shaft 38, adapted to rotate in the same or opposite direction as roller 24, and/or for transverse oscillation, as desired. Alternatively, a conventional, commercially available ultrasonic web cleaner may be employed.

The potential difference between rollers 20 and 24 is suitably effected by coupling rollers 20 and 24 to the respective output terminal of power supply 25. Electrical connection to electrode rollers 20 and 24 are suitably effected through respective rotary connections, such as conventional brush mechanisms, or, preferably, a suitable commercially available mercury wetted rotary connector.

Power supply 25 suitably provides, on a selective basis, a D.C. voltage of a magnitude in accordance with the characteristics of web 12 and the extent of (percentage) demetallization desired. It is desirable that the voltage be low enough to avoid arcing and generation of heat levels sufficient to damage the web substrate. The use of non-conductive nips and idler rollers is helpful in this regard. For webs typically employed in microwave packaging, a voltage of on the order of 90 v has been found to be suitable. Power supply 25 is suitably variable over a range of voltages (e.g. 0–200 v or greater) to permit optimization of the voltage level for a particular application.

The extent (percentage) of demetallization, and thus the resistivity of the web, can be controlled by varying the level of the voltage provided by supply 25. For a given speed of web movement, applying a voltage of lesser magnitude than that associated with complete demetallization at that speed, will cause a partial demetallization (increase resistivity; decrease optical density). Thus, by modulating the voltage applied to roller 20, a pattern of varying degrees of demetallization (resistivity; optical density) can be established. For example, in the simplest sense, power supply 25 can be selectively activated and deactivated, at a 100% demetallization level, to demetallize areas of web 12, extending across web 12 with an orientation transverse to the direction of web movement. More complicated patterns of varying resistivity can, of course be established, by varying the applied voltage in accordance with a predetermined function, established, e.g., by employing conventional microprocessor control techniques, as is well known in the art. To facilitate control, positional feedback information may be provided to microprocessor 25 from e.g., a conventional encoder 25 cooperating with roller 24.

More complex patterns of demetallization may be effected through use of a corresponding pattern of conductive areas on roller 24. Such a pattern can be established by raising portions of roller 24 in accordance with the pattern such that only the raised portions make contact with web 12. Preferably, however, the surface of roller 24 may be formed with respective conductive and non-conductive areas to define a desired pattern 34 (FIG. 2). For example, where roller 24 is formed of aluminum, areas of the surface can be selectively hardcoat anodized to render those areas nonconductive. If desired, the conductive areas of the roller surface corresponding to the pattern of demetallization can be plated with a wear resistant conductive metal, such as, e.g., nickel. Thus, roller 24 is of a constant diameter, with a substantially smooth surface, facilitating cooperation with a small diameter nip roller 26, and cleaner 35. The pattern of conductive or non-conductive areas may be effected integrally on the surface of roller 24 or may be effected through use of a sheath, in general analogy to a printing plate. The diameter of roller 24 would be chosen in accordance with the repeat length of the patterns.

Particularly complex patterns, and patterns including elements of varying percentage of demetallization, can be effected by the combined use of a patterned roller 24 and modulation of the potential difference between rollers 20 and 24. Such complex patterns can further be facilitated by the use of a series of demetallizers 10 (e.g., 10, 10A in FIG. 1) operating in registry.

Figure 3:
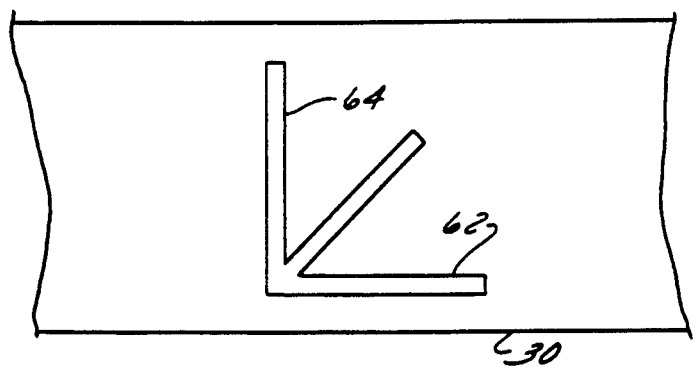
FIG. 3 is a partial schematic of a web having acomposite pattern superimposed thereon in accordance with the present invention.
Figure 4A:
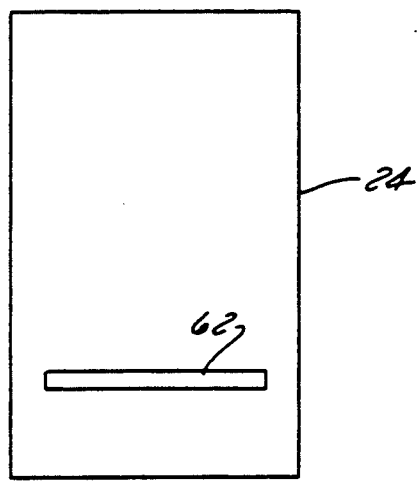
FIGS. 4A and 4B are block schematics of electrodes bearing patterns for producing the composite web pattern of FIG. 3.
Figure 4B:
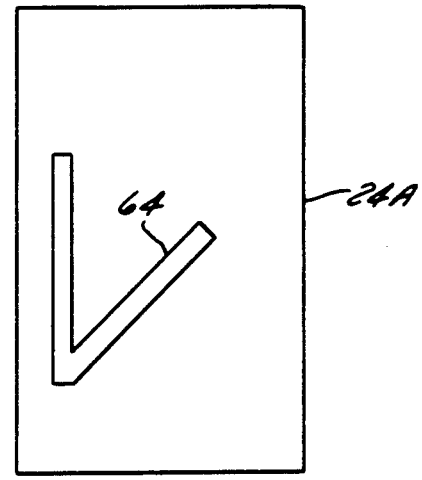

With reference to FIGS. 1, 3, and 4, the pattern may include respective elements of different resistivities disposed along (e.g., overlapping) a common line perpendicular to the direction of web movement. For example, roller 24 of demetallizer 10 may suitably bear a demetallizing pattern 62 and roller 24A of demetallizer 10A may suitably bear a different pattern 64. As the web engages roller 24, which is maintained at a first voltage corresponding to a first resistivity, the web is demetallized in accordance with pattern 62. As the web subsequently engages roller 24A, which is maintained at a second voltage corresponding to a second resistivity (which may be greater, less than, or equal to the first resistivity), pattern 64 is superimposed upon the web. The resulting composite pattern (FIG. 3) may thus exhibit different resistivities at different points along a line perpendicular to web travel. Registry can be maintained between units 10 and 10A can be maintained employing techniques well known in the art. See, e.g., McKenney et al. U.S. Pat. No. 2,576,529 issued Nov. 27, 1951.

The use of a series of demetallizers 10 provides great flexibility. For example, where demetallizer 10 provides less than 100% demetallization, demetallizer 10A can be utilized to provide additional percentage demetallization to selected areas already partially demetallized by demetallizer 10. Further, the potential difference between rollers 20 and 24, of one or more of the demetallizers can be modulated to selectively vary the resistivity of portions of the pattern.

It will be understood that the above description is a preferred exemplary embodiment of the present invention, and that the invention is not limited to the specific forms shown. Various other substitutions, modifications, changes, and omissions may be made in the design and arrangement of the elements without departing from the spirit of the invention as expressed in the appended claims.

We claim:

1. A method of selectively demetallizing a metallized web moving along a web path, comprising the steps of:
   selectively generating a potential difference between first and second electrodes disposed spaced apart along said web path, said second electrode comprising a roller extending transversely across said path;
   effecting a first electrical contact of relatively large area between said moving web and said first electrode;
   effecting a second electrical contact between said web and said second electrode, said second electrical contact being of an area less than the area of said first electrical contact, producing a high density current to demetallize said web at said second electrical contact; and,
   controllably varying the magnitude of the potential difference to control the degree of demetallization of said web.

2. The method of claim 1 wherein said controllably varying step comprises selectively turning said potential differential on and off.

3. The method of claim 1 wherein said controllably varying step comprises varying the magnitude of said potential difference in accordance with a predetermined pattern.

4. A method of selectively demetallizing a metallized web moving along a web path, comprising the steps of:
   selectively generating a potential difference between first and second electrodes disposed spaced apart along said web path, said second electrode comprising a roller extending transversely across said path;

effecting a first electrical contact of relatively large area between said moving web and said first electrode;

effecting a second electrical contact between said web and said second electrode, said second electrical contact being of an area less than the area of said first electrical contact, producing a high density current to demetallize said web at said second electrical contact; and, removing metal deposited on said second electrode.

5. An apparatus for demetallizing a metallized web moving along a path of the type comprising first and second electrodes, means for generating potential difference between said electrodes, and means for establishing an electrical connection between the electrodes and the metallized web, improved wherein:

said first electrode effects a first predetermined area of contact with said web;

said second electrode includes a curved portion and effects a second predetermined area of contact with said web, said second predetermined area being less than said first predetermined area;

said second electrode manifests a predetermined pattern and is formed, at least in part, of aluminum and portions thereof are anodized, in accordance with said pattern, to render such portions non-conductive, whereby said metallized web is demetallized in accordance with said pattern; and, said means for establishing an electrical connection between said electrodes and said web includes means for effecting contact between said web and means for forming a curved portion in said web path oppositely directed from the curved portion of said second electrode and biasing said web against said curved portion of said second electrode, in said curved portion of said web path.

6. An apparatus for demetallizing a metallized web moving along a path of the type comprising first and second electrodes, means for generating a potential difference between said electrodes, and means for establishing an electrical connection between the electrodes and the metallized web, improved wherein:

said first electrode effects a first predetermined area of contact with said web;

said second electrode includes a curved portion and effects a second predetermined area of contact with said web, said second predetermined area being less than said first predetermined area;

said second electrode manifests a predetermined pattern and portions of said second electrode in accordance with said pattern are plated with a conductive material, whereby said metallized web is demetallized in accordance with said pattern; and, said means for establishing an electrical connection between said electrodes and said web includes means for effecting contact between said web and means for forming a curved portion in said web path oppositely directed from the curved portion of said second electrode and biasing said web against said curved portion of said second electrode, in said curved portion of said web path.

7. The apparatus of claim 6 wherein portions of said second electrode in accordance with said pattern are plated with nickel.

8. An apparatus for demetallizing a metallized web moving along a path, said apparatus being of the type comprising first and second electrodes, means for generating a potential difference between said electrodes, and means for establishing an electrical connection between the electrodes and the metallized web, improved wherein said means for generating a potential difference includes means for selectively effecting partial demetallization of areas of said web by varying the magnitude of the potential in accordance with a predetermined pattern.

9. The apparatus of claim 8 wherein at least one of said electrodes comprises a roller.

10. An apparatus for demetallizing a metallized web moving along a path of the type comprising first and second electrodes, means for generating a potential difference between said electrodes, and means for establishing an electrical contact between said electrodes and said metallized web, improved wherein:

each electrode comprises a roller; and said means for establishing contact includes:

means for establishing a relatively large area of contact between said metallized web and said first electrode;

means for establishing a relatively small area of contact along a line transverse to said web path between said metallized web and said second electrode to produce a high density current between said web and said second electrode; and, means for removing metal deposited on the second roller.

11. Apparatus for selectively demetallizing a metallized web moving along a web path, comprising:

a first conductive roller at a first electrical potential;

a second conductive roller at a second electrical potential;

a first nip roller;

a second nip roller;

said first and second conductive rollers being spaced apart proximate said web, said first nip roller being disposed relative to said first roller to interact with said first roller;

said first conductive roller and said first nip roller being disposed such that said metallized web wraps around a substantial portion of said first conductive roller to thereby establish a relatively large area of electrical contact;

said second conductive roller and said second nip roller being disposed to effect electrical contact between said second conductive roller and said metallized web along a line transverse to the direction of web movement.

12. An apparatus for demetallizing a metallized web moving along a path, said apparatus being of the type comprising first and second electrodes, means for generating a potential deference between said electrodes, and means for establishing an electrical connection between the electrodes and the metallized web, improved wherein:

said second electrode manifests a predetermined pattern, whereby metallized web is demetallized in accordance with said a pattern; and said second electrode is formed, at least in part, of aluminum and portions thereof are anodized, in accordance with said pattern, to render such portions nonconductive.

13. A method of selectively demetallizing a metallized web moving along a web path, comprising the steps of:

selectively generating a potential difference between first and second electrodes disposed spaced apart along said web path, said second electrode comprising a roller extending transversely across said path;

effecting a first electrical contact of relatively large are between said moving web and said first electrode;

effecting a second electrical contact between said web and said second electrode, said second electrical contact being of an area less than the area of said first electrical contact, producing a high density current to demetallize said web at said second electrical contact; and, varying said potential difference to selectively vary the percentage demetallization and create partially demetallized areas on said web.

14. A method of selectively demetallizing a metallized web moving along a web path, comprising the steps of:

selectively generating a potential difference between first and second electrodes disposed spaced apart along said web path, said second electrode comprising a roller extending transversely across said path;

effecting a first electrical contact of relatively large are between said moving web and said first electrode;

effecting a second electrical contact between said web and said second electrode, said second electrical contact being of an area less than the area of said first electrical contact, producing a high density current to demetallize said web at said second electrical contact;

selectively generating a potential difference between third and fourth electrodes disposed along said web path;

effecting a third electrical contact having a relatively large area between said moving web and said third electrode; and effecting a fourth electrical contact between said web and said fourth electrode, said fourth electrical connection having a relatively small area, producing a high density current to demetallize said web at said fourth electrode.

15. The method of claim 14 wherein:
said second electrode manifests a first part of a composite pattern;
said fourth electrode manifests a second part of said composite pattern;
and further including the steps of:
routing said web to said first and second electrodes and to said third and fourth electrodes in sequence;
effecting demetallization of said web in accordance with said first part of said pattern at said second electrode; and
effecting demetallization of said web in accordance with said second part of said pattern at said fourth electrode.

16. The method of claim 15 wherein:
said first part of said pattern comprises a portion aligned with the direction of movement of said web along said path; and
said second part of said pattern comprises a portion transverse to the direction of movement of said web along said path.

17. The method of claim 14 wherein:
said selectively generating a potential difference between first and second electrodes step comprises generating a potential of a first magnitude; and
said selectively generating a potential difference between third and fourth electrodes step comprises generating a potential of a second magnitude.

18. The method of claim 14 wherein:
said second electrode manifests a first pattern;
said fourth electrode manifests a second pattern including at least one element in common with said first pattern;
and including the step of:
effecting further demetallization of said web in accordance with said element common to said first and second patterns at said fourth electrode to provide a composite pattern with elements of differing optical density.

19. A method for making microwavable packaging material comprising a substrate having metallized areas of different optical density from a metallized substrate, said method comprising the steps of:
selectively effecting electrical contact between said metallized substrate and a set of respective electrodes;
generating a potential difference between said respective electrodes of said set of a magnitude to partially demetallize to a predetermined optical density selected areas of said substrate at one of said electrodes.

20. The method of claim 14 wherein said predetermined optical density is in the range of 0.18 to 0.29.

21. The method of claim 19 wherein said microwavable packaging material is adapted to contain foodstuff in the vicinity of said selected partially demetallized areas and said step of generating a potential difference is carried out such that the predetermined optical density obtained is sufficient to effect browning of said foodstuff upon microwaving a package made of said microwavable packaging material containing said foodstuff at said selected areas.

22. The method of claim 21 further comprising the step of varying the optical density of selected areas of said substrate by varying the magnitude of said potential difference to vary the extent of the partial demetallization of said selected areas of said substrate.

23. The method of claim 21 wherein:
said substrate comprises a metallized film web;
at least one of said electrodes comprises a roller; and
said selectively effecting electrical contact step comprises effecting a line contact between the metallization on said film and said roller as said web moves along a predetermined path.

24. The method of claim 21 further comprising the step of:
varying the optical density of selected areas of said substrate by selectively effecting electrical contact between said metallized substrate and the respective electrodes of a second set of respective electrodes to at least partially demetallize such selected areas of said substrate.

25. The method of claim 24 further comprising the step of varying the magnitude of the potential difference between the electrodes of said second set.

26. The method of claim 24 wherein:
one of said first mentioned set of electrodes manifests a first part of a composite pattern;
one of said second set of electrodes manifests a second part of said composite pattern;
and comprising the steps of:
routing said substrate along a path to said first mentioned and second set of electrode in sequence;

effecting demetallization of said metallized substrate in accordance with said first part of said pattern at said first mentioned set electrode; and effecting demetallization of said metallized substrate in accordance with said second part of said pattern at said second set electrode.

27. The method of claim 26 wherein:

said first pat of said pattern comprises a portion aligned with the direction of movement of said metallized substrate along said path; and said second part of said pattern comprises a portion transverse to the direction of movement of said metallized substrate along said path.

28. The method of claim 24 wherein:

said generating a potential difference between the respective electrodes of said first mentioned set step comprises generating a potential of a first magnitude; and said generating a potential difference between the respective electrodes of said second set step comprises generating a potential of a second magnitude.

29. The method of claim 24 wherein:

one of said first mentioned set of electrodes manifests a first pattern;

one of said second set of electrodes manifests a second pattern including at least one element in common with said first pattern;

and comprising the steps of:

routing said substrate along a path to said first mentioned and said second set of electrodes in sequence; and effecting further demetallization of said metallized substrate in accordance with said element common to said first and second patterns at said second set electrode to provide a composite pattern with elements of differing optical density.

30. An apparatus for making microwavable packaging material, comprising:

means for routing a metallized substrate along a path;

first and second electrodes disposed in spaced relation along said path;

means for selectively establishing a potential difference between said first and second electrodes; and, means for establishing an electrical contact between said metallized substrate and said first and second electrode to partially demetallize areas on said substrate, such that each of said substrate areas manifest a desired optical density.

31. The apparatus of claim 30 wherein said second electrode includes conductive portions and non-conductive portions corresponding to a first demetallization pattern.

32. The apparatus of claim 31 further including:

third and fourth electrodes disposed along said path in spaced relation to said first and second electrodes, said fourth electrode bearing a second demetallization pattern;

means for selectively establishing a potential difference between said third and fourth electrodes; and means for establishing an electrical contact between said substrate and said third and fourth electrodes to at least partially demetallize said substrate in accordance with said second demtallization pattern.

33. The apparatus of claim 32 wherein said first demetallizaton pattern includes a plurality of elements and said second demetallization pattern includes at least one element disposed in accordance with an element of said first demetallization pattern, such that partially demetallized areas of different optical densities are formed on said substrate.

34. A method of making packaging for microwavable foodstuffs, said packaging material having predetermined regions of different optical density, said method comprising the steps of:

conveying a metallized web along a web path, into electrical contact with first and second electrodes disposed in spaced relation along said web path, said second electrode bearing a desired demetallizaton pattern;

selectively generating a potential difference between said fist and second electrodes; and, demetallizing said web in accordance with said desired demetallization pattern by effecting a relatively high density current flow between said second electrode and said web and partially demetallizing portions of said web to form partially demetallized areas of different optical densities.

35. A method for making microwavable packaging material comprising a substrate having metallized areas of different optical density from a metallized substrate, said method comprising the steps of:

routing said substrate along a path to first and second sets of electrodes in sequence;

selectively effecting electrical contact between said metallized substrate and said first set of respective electrodes, one of said first set of electrodes manifesting a first part of a composite pattern, said first part of said pattern comprising a portion aligned with the direction of movement of said metallized substrate along said path; and generating a potential difference between said respective electrodes of said first set of a magnitude to at least partially demetallize selected areas of said substrate in accordance with said pattern first parts;

selectively effecting electrical contact between said metallized substrate and the respective electrodes of a second set of respective electrodes, one of said second set of electrodes manifesting a second part of said composite pattern, said second part of said pattern comprising a portion transverse to the direction of movement of said metallized substrate along said path;

generating a potential difference between said respective electrodes of said second set of a magnitude to at least partially demetallize selected areas of said substrate in accordance with said pattern second part.

36. A method for making microwavable packaging material comprising a substrate having metallized areas of different optical density from a metallized substrate, said method comprising the steps of:

selectively effecting electrical contact between said metallized substrate and said first set of respective electrodes; and generating a potential difference between said respective electrodes of said first set of a first magnitude to at least partially demetallize selected areas of said substrate at one of said electrodes;

selectively effecting electrical contact between said metallized substrate and the respective electrodes of a second set of respective electrodes;

generating a potential difference between said respective electrodes of said second set of a second magnitude to at least partially demetallize selected areas of said substrate at one of said electrodes.

37. An apparatus for demetallizing a metallized web moving along a path of the type comprising first and second electrodes, means for generating a potential difference between said electrodes, and means for establishing an electrical connection between the electrodes and the metallized web, improved wherein:

said second electrode includes a curved portion and is formed, at least in part, of aluminum and portions thereof are anodized, in accordance with a predetermined pattern, to render such portions non-conductive, whereby said metallized web is demetallized in accordance with said pattern; and said means for establishing an electrical connection between said electrodes and said web includes means for forming a curved portion in said web path oppositely directed from the curved portion of said second electrode and biasing said web against said curved portion of said second electrode, in said curved portion of said web path.

38. An apparatus for demetallizing a metallized web moving along a path of the type comprising first and second electrodes, means for generating a potential difference between said electrodes, and means for establishing an electrical connection between the electrodes and the metallized web, improved wherein:

said second electrode includes a curved portion and portions manifesting a predetermined pattern are plated with a conductive material, whereby said metallized web is demetallized in accordance with said pattern; and said means for establishing an electrical connection between said electrodes and said web includes means for forming a curved portion in said web path oppositely directed from the curved portion of said second electrode and biasing said web against said curved portion of said second electrode, in said curved portion of said web path.

39. The apparatus of claim 38 wherein portions of said second electrode in accordance with aid pattern are plated with nickel.

40. A method for making microwavable packaging material comprising a substrate having metallized areas of different optical density from a metallized substrate, said method comprising the steps of: selectively effecting electrical contact between said metallized substrate and a first set of respective electrodes;

generating a potential difference between said respective electrodes of said set of a magnitude to at least partially demetallize selected areas of said substrate at one of said electrodes;

varying the optical density of predetermined areas of said substrate by selectively effecting electrical contact between said metallized substrate and the respective electrodes of a second set of respective electrodes to at least partially demetallize such predetermined ares of said substrate; and, varying the magnitude of the potential difference between the electrodes of said second set.

41. A method for making microwavable packaging material comprising a substrate having metallized areas of different optical density from a metallized substrate, said method comprising the steps of:

selectively effecting electrical contact between said metallized substrate and a first set of respective electrodes;

generating a potential difference between said respective electrodes of said first set of a magnitude to at least partially demetallize selected areas of said substrate at one of said electrodes, said one of said first set of electrodes manifesting a first part of a composite pattern;

varying the optical density of predetermined areas of said substrate by selectively effecting electrical contact between said metallized substrate and the respective electrodes of a second set of respective electrodes to at least partially demetallize such predetermined ares of said substrate, wherein one of said second set of electrodes manifests a second part of said composite pattern;

routing said substrate along a path to said first and second set of electrodes in sequence;

effecting demetallizaton of said metallized substrate in accordance with said first part of said pattern at said first mentioned set electrode; and effecting demetallizaton of said metallized substrate in accordance with said second part of said pattern at said second set electrode.

42. The method of claim 41 wherein:

said first part of said pattern comprises a portion aligned with the direction of movement of said metallized substrate along said path; and said second part of said pattern comprises a portion transverse to the direction of movement of said metallized substrate along said path.

43. A method for making microwavable packaging material comprising a substrate having metallized areas of different optical density from a metallized substrate, said method comprising the steps of:

selectively effecting electrical contact between said metallized substrate and a first set of respective electrodes;

generating a potential difference between said respective electrodes of said first set of a magnitude to at least partially demetallize selected areas of said substrate at one of said electrodes, said one of said first set of electrodes manifesting a first pattern;

varying the optical density of predetermined areas of said substrate by selectively effecting electrical contact between said metallized substrate and the respective electrodes of a second set of respective electrodes to at least partially demetallize such predetermined areas of said substrate, wherein one of said second set of electrodes manifests a second pattern including at least one element in common with said first pattern;

routing said substrate along a path to said first and said second set of electrodes in sequence; and effecting further demetallization of said metallized substrate in accordance with said element common to said first and second patterns at said second set electrode to provide a composite pattern with elements of differing optical density.

44. An apparatus for making microwavable packaging material, comprising:

means for routing a metallized substrate along a path:

first and second electrodes disposed in spaced relation along said path, said second electrode including conductive portions and non-conductive portions corresponding to a first demetallization pattern;

means for selectively establishing a potential difference between said first and second electrodes; and means for establishing an electrical contact between said metallized substrate and said first and second electrode to at least partially demetallize areas on said substrate, such that each of said substrate areas manifest a desired optical density;

third and fourth electrodes disposed along said path in spaced relation to said first and second electrodes, said fourth electrode bearing a second demetallization pattern;

means for selectively establishing a potential difference between said third and fourth electrodes; and means for establishing an electrical contact between said substrate and said third and fourth electrodes to at least partially demetallize said substrate in accordance with said second demetallizaton pattern.

45. The apparatus of claim 44 wherein said first demetallization pattern includes a plurality of elements and said second demetallization pattern includes at least one element disposed in accordance with an element of said first demetallization pattern, such that partially demetallized areas of different optical densities are formed on said substrate.

46. A method for making microwavable packaging material comprising a substrate having metallized areas of different optical density from a metallized substrate, said method comprising the steps of:

selectively effecting electrical contact between said metallized substrate and a set of respective electrodes;

generating a potential difference between said respective electrodes of said set of a magnitude to at least partially demetallize selected areas of said substrate at one of said electrodes; and varying the optical density of predetermined areas of said substrate by varying the magnitude of said potential difference to vary the extent of the partial demetallization of said predetermined areas of said substrate.

47. A method of selectively demetallizing a metallized web moving along a web path, comprising the steps of:

selectively generating a potential difference between first and second electrodes disposed spaced apart along said web path;

effecting respective electrical contacts between said moving web and said first electrode and between said web and said second electrode, producing a high density current to demetallize said web at said second electrical contact; and varying said potential difference to selectively vary the percentage demetallization and create partially demetallized areas on said web.

48. A method of making packaging for microwavable food stuffs, said packaging material having predetermined regions of different optical density, said method comprising the steps of:

conveying a metallized web along a web path, into electrical contact with first and second electrodes disposed in spaced relation along said web path, said second electrode bearing a desired demetallization pattern;

selectively generating a potential difference between said second electrode and said web;

demetallizing said web in accordance with said desired demetallizaton pattern by effecting a current flow between said second electrode and said web;

said demetallizing step including the step of partially demetallizing portions of said web to form partially demetallized areas of different optical densities.

49. A method for making microwavable packaging material comprising a substrate having metallized ares of different optical density from a metallized substrate having a characteristic resistance of on the order of 100 ohm/square, said method comprising the steps of:

selectively effecting electrical contact between said metallized substrate and a set of respective electrodes;

generating a potential difference between said respective electrodes of said set of a magnitude to partially demetallize selected areas of said substrate at one of said electrodes.

* * * * *